United States Patent
Scholten et al.

(10) Patent No.: US 12,247,892 B2
(45) Date of Patent: Mar. 11, 2025

(54) ECOAIR VALVE WITH PNEUMATIC SOLENOID TO PROVIDE AUTO ZERO FUNCTION FOR AIR VELOCITY PRESSURE SENSOR

(71) Applicant: Johnson Controls Tyco IP Holdings LLP, Milwaukee, WI (US)

(72) Inventors: John Scholten, Roswell, GA (US); Jon Douglas, Mequon, WI (US); Jack A. Peterson, Brookfield, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/135,320

(22) Filed: Apr. 17, 2023

(65) Prior Publication Data

US 2023/0251158 A1     Aug. 10, 2023

Related U.S. Application Data

(63) Continuation of application No. 16/849,739, filed on Apr. 15, 2020, now Pat. No. 11,630,019.

(51) Int. Cl.
*G01L 27/00* (2006.01)
*F15B 19/00* (2006.01)
(Continued)

(52) U.S. Cl.
CPC .......... *G01L 27/005* (2013.01); *F15B 19/005* (2013.01); *G01F 1/36* (2013.01); *G01F 25/10* (2022.01); *F24F 2110/40* (2018.01)

(58) Field of Classification Search
CPC ........ G01L 27/005; F15B 19/005; G01F 1/36; G01F 25/10
See application file for complete search history.

(56) References Cited

U.S. PATENT DOCUMENTS

| 4,453,417 A | 6/1984 | Moyers et al. |
| 9,447,985 B2 | 9/2016 | Johnson |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Ryan D Walsh
(74) *Attorney, Agent, or Firm* — Foley & Lardner LLP (57) ABSTRACT

An airflow sensor assembly for an air duct is provided. The airflow sensor assembly includes the air duct having an interior wall and an exterior wall, a high pressure pickup device, a low pressure pickup device, a pressure redirection device, and a pressure sensor. The pressure redirection device is fluidly coupled to the high pressure pickup device and the low pressure pickup device and includes a low inlet, a high inlet, and a common outlet. The pressure sensor is selectively fluidly coupled to the high pressure pickup device and the low pressure pickup device and includes a first inlet and a second inlet. The second inlet is fluidly coupled to the common outlet of the pressure redirection device.

18 Claims, 6 Drawing Sheets

(51) Int. Cl.
   *F24F 110/40* (2018.01)
   *G01F 1/36* (2006.01)
   *G01F 25/10* (2022.01)

(56) References Cited

U.S. PATENT DOCUMENTS

| | | | |
|---|---|---|---|
| 10,451,461 | B2 | 10/2019 | Nesbitt et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 11,630,019 | B2 * | 4/2023 | Scholten ............... G01F 25/10 702/50 |
| 2014/0124057 | A1 | 5/2014 | Freund et al. |
| 2019/0219300 | A1 | 7/2019 | Scholten et al. |
| 2019/0219430 | A1 | 7/2019 | Scholten |
| 2021/0172778 | A1 | 6/2021 | Scholten et al. |
| 2021/0172779 | A1 | 6/2021 | Scholten |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0221184 | A1 | 7/2022 | Gupta et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0293261 | A1 | 9/2022 | McBrady et al. |
| 2022/0305438 | A1 | 9/2022 | Wenger et al. |
| 2022/0305881 | A1 | 9/2022 | Neu et al. |

FOREIGN PATENT DOCUMENTS

| | | |
|---|---|---|
| EP | 3 186 687 A4 | 7/2017 |
| EP | 3 497 377 A1 | 6/2019 |
| JP | H07-243930 A | 9/1995 |
| JP | H1183659 A | 3/1999 |
| JP | 2015-034762 A | 2/2015 |
| WO | WO-2019/143863 A1 | 7/2019 |

OTHER PUBLICATIONS

Extended European Search Report for Application No. EP 21168477.4 mailing date Sep. 13, 2021, 20 pages.
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System—Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "Jla Medical Building Building Automation," URL: http://cooljohnson.com/Building-Automation-Systems-Michigan/Waterford-Michigan/Building-Automation-System—JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

(56) References Cited

OTHER PUBLICATIONS

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Price: PCV—Pressure Control Valve; https://www.priceindustries.com/terminalunits/products/pressure-control-valve; retrieved from the internet on Jan. 12, 2023 (2 pages).
EP Office Action for Appl. Ser. No. EP 211684777.4 dated Aug. 10, 2023 (7 pages).
Alvarado et al., "A Methodology to Monitor Airborne PM10 Dust Particles Using a Small Unmanned Aerial Vehicle," Sensors, 2017, vol. 17 (25 pages).

\* cited by examiner

FIG. 4
Section B-B

ECOAIR VALVE WITH PNEUMATIC SOLENOID TO PROVIDE AUTO ZERO FUNCTION FOR AIR VELOCITY PRESSURE SENSOR

CROSS-REFERENCE TO RELATED APPLICATIONS

This application is a continuation of U.S. patent application Ser. No. 16/849,739 filed Apr. 15, 2020, which is incorporated by reference herein its entirety.

BACKGROUND

The present disclosure relates, in exemplary embodiments to air duct airflow sensors. Air dampers are mechanical valves used to permit, block, and control the flow of air in air ducts. Typically, a pressure sensor is incorporated to detect and measure the air velocity pressure in the air duct. Pressure measurement is used to determine the amount of airflow in the control valve.

It would be desirable to have a system to measure an offset value of an airflow sensor. Even though the sensors are very accurate, the sensors exhibit an offset in readings, which can result in inaccurate readings, especially with lower airflows. This offset can change with time and even if the offset is calibrated out at initial valve manufacture, the offset will cause errors after some time. It would be desirable to have a system that periodically and automatically calibrates this offset.

SUMMARY

One implementation of the present disclosure is an airflow sensor assembly for an air duct. The airflow sensor assembly includes the air duct having an interior wall and an exterior wall, a high pressure pickup device, a low pressure pickup device, a pressure redirection device, and a differential pressure sensor. The pressure redirection device is pneumatically coupled to the high pressure pickup device and the low pressure pickup device and includes a low inlet, a high inlet, and a common outlet. The pressure sensor is selectively fluidly coupled to the high pressure pickup device and the low pressure pickup device and includes a first inlet and a second inlet. The second inlet is fluidly coupled to the common outlet of the pressure redirection device.

Another implementation of the present disclosure is a method of recalibrating an offset of a sensor in an air duct including a low pressure pickup device, a high pressure pickup device, and a pressure redirection device. The method includes receiving a first pressure at a first inlet of the sensor from the low pressure pickup device, receiving a second pressure at a second inlet of the sensor from the low pressure pickup device, and determining an offset value from the sensor by effectively pneumatically shorting high and low pressure ports of the sensor, even though a common mode pressure may be present from either the high or low pickup device using the first pressure and the second pressure. The method also includes receiving a third pressure at the first inlet of the sensor from the low pressure pickup device, receiving a fourth pressure at the second inlet of the sensor from the high pressure pickup device, and determining an actual value using a first value associated with the third pressure, a second value associated with the fourth pressure, and the offset value.

The controller reads the absolute differential pressure from the sensor and subtracts the offset value read and retained from the sensor when the solenoid was active and the sensor exhibited an offset value in some embodiments. The adjusted value is multiplied by a gain value and a true flow pressure reading is obtained in some embodiments. This value and the valve flow area and a specific constant are used to obtain airflow through the valve in some embodiments.

Another implementation of the present disclosure is an airflow sensor assembly. The airflow sensor assembly includes a pressure sensor, and a controller. The pressure sensor includes a first inlet and a second inlet. The controller provides a low pressure airflow to the first inlet and to the second inlet at a first time. The controller also provides an offset value determined using the low pressure airflow at the first inlet and the second inlet at the first time. The controller provides a high pressure airflow to the first inlet at a second time and a low pressure airflow at the second time to the second inlet. The controller also determine a first value using the offset value and a second value associated with the high pressure airflow at the second time and a third value associated with the low pressure airflow at the second time.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangements of parts, proportion, degree, or the like) together with the specification and are to be considered a portion of the entire written description of this disclosure. As used in the following description, the terms "horizontal", "vertical", "left", "right", "up", and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation.

Figure 1:
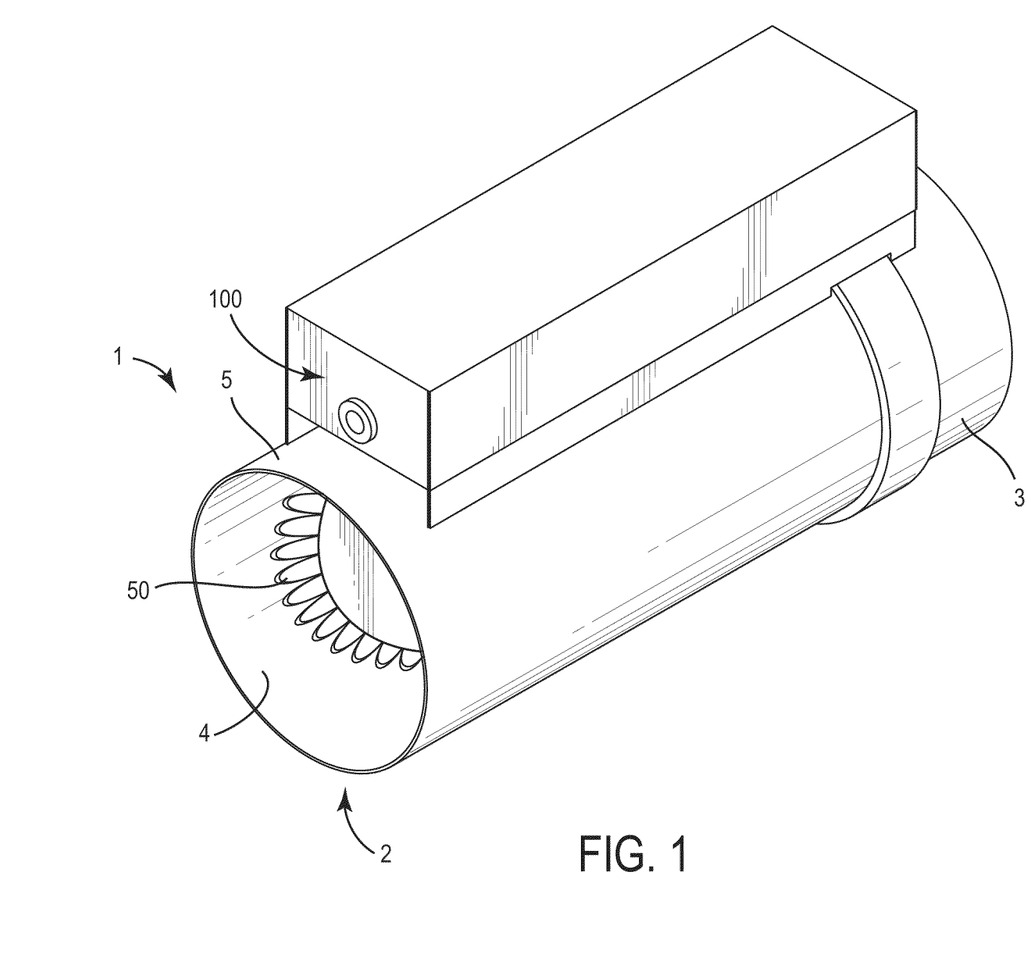
FIG. 1 is an isometric view of an air duct assembly, according to some embodiments.

FIG. 1 depicts an isometric view of a cylindrical air duct assembly 1. As shown, the air duct assembly 1 includes a first end 2, a second end 3, and interior wall 4, an exterior wall 5, and a control assembly. Air duct assembly 1 is further shown to include an air damper assembly 50 situated within the interior wall 4 to control the volume of air flowing through the cylindrical air duct assembly 1.

Figure 2:
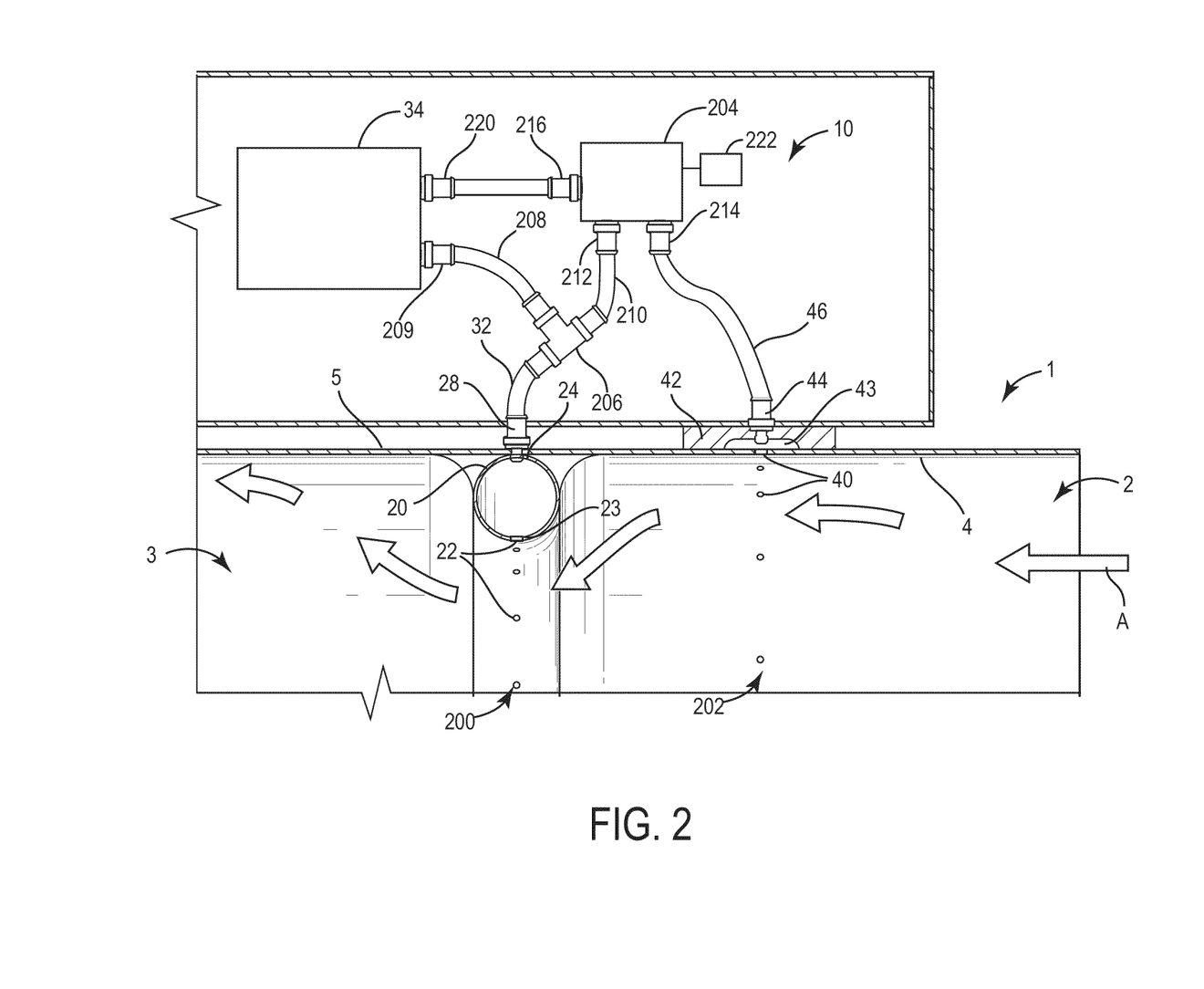
FIG. 2 is a side cross-sectional view of an air duct airflow sensor assembly, according to some embodiments.
Figure 3:
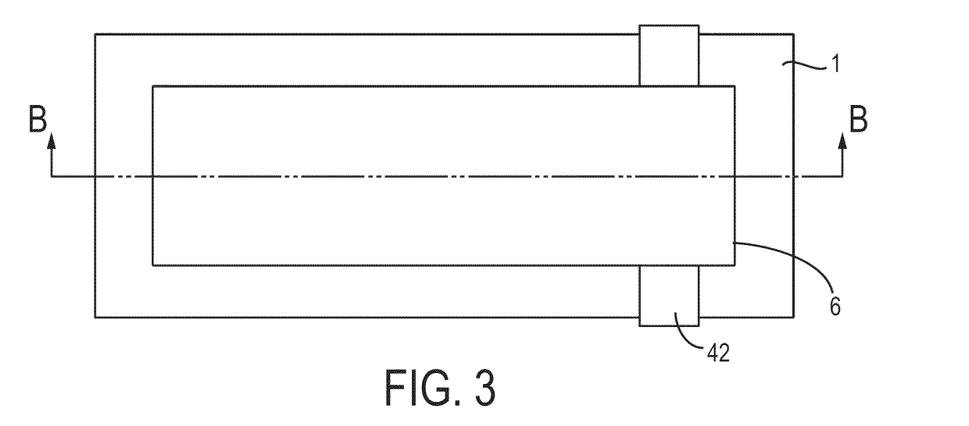
FIG. 3 is top view of the air duct assembly of FIG. 1, according to some embodiments.
Figure 4:
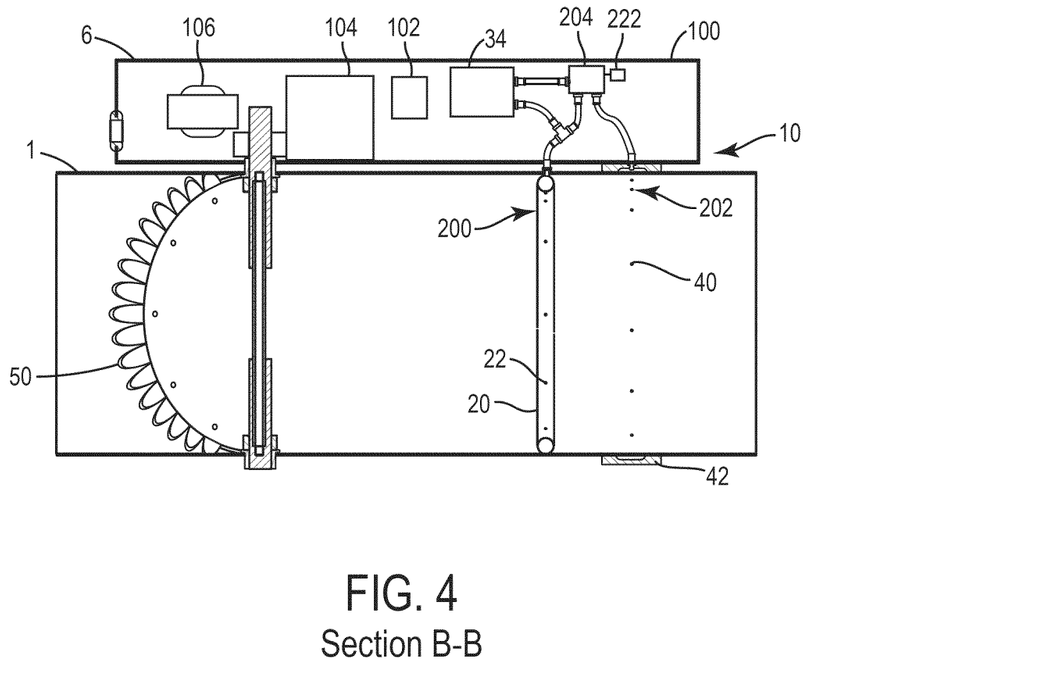
FIG. 4 is a side cross-sectional view of the air duct assembly taken along the line B-B of FIG. 3, according to some embodiments.

Referring now to FIGS. 2-4, various views depicting the air duct airflow sensor assembly 10 are shown, according to some embodiments. Air may flow through the air duct airflow sensor assembly 10 in the direction indicated by arrow "A" as shown in FIG. 2. The air duct airflow sensor assembly 10 includes a low pressure pickup device 200, a high pressure pickup device 202, and a pressure redirection device 204. The low pressure pickup device 200 comprises a hollow channel 20 which is mounted to or otherwise associated with the interior wall 4. In some embodiments, the outer diameter of the hollow channel 20 can range from 0.5 inches to 0.75 inches. In an exemplary embodiment, the outer diameter of the hollow channel 20 is 0.625 inches. The channel 20 has a plurality of apertures 22 defined in the inner periphery 23 of the ring (versus the outer periphery 24 which is proximate to the interior wall 4). In exemplary embodiments, the apertures 22 are disposed in the inner periphery of the channel 20 such that they are generally orthogonal to the orientation of airflow, so that air flows across the apertures 22, rather than flowing into the apertures 22.

A hollow connector nipple 28 is connected to an aperture defined in the channel 20 and an aperture defined in the duct 1. A tube 32 is connected to the nipple 28. Air flowing into the apertures 22 can flow through the channel 20, into the nipple 28, and through the tube 32. The tube 32 is connected to a T 206. A tube 208 is connected to a first side of the T 206 and a first inlet 209 of a pressure sensor 34 such that at least a portion of the air flowing through the tube 32 is received and detected by the flow pressure sensor 34. A tube 210 is connected to a second side of the T 206 and a low inlet 212 of the pressure redirection device 204. Another portion of the air may be may flow through the tube 210 and into the pressure redirection device 204. The channel 20 imports air pressure from the air duct 1 to the tube 32.

The air duct 1 further includes multiple apertures 40 defined therein, the apertures 40 being arranged generally in a ring-shape around the interior wall 4. The apertures 40 are defined within a channel 42.

A hollow connector nipple 44 is connected to the channel 42. In exemplary embodiments, a gasket guarding ring may be used and is fitted over the channel 42. A tube 46 is connected to the nipple 44. The tube 46 is connected to a high inlet 214 of the pressure redirection device 204. In an alternative exemplary embodiment, a separate pressure sensor (not shown) can be connected to the tube 46. The apertures 40, channel 42, nipple 44, tube 46, and pressure sensor 34 form a high pressure pickup device 202.

A common outlet 216 of the pressure redirection device 204 is connected to a pipe 218. The pipe 218 is coupled to a second inlet 220 of the flow pressure sensor 34. In exemplary embodiments, the pressure redirection device 204 is a solenoid valve. The pressure redirection device 204 can selectively fluidly couple the high inlet 214 or the low inlet 212 to the common outlet 216. The pressure redirection device 204 may translate (e.g., rotate, redirect, etc.) a flow path (e.g., a wall, a valve, a tube, etc.) provided within the pressure redirection device 204. In some examples, the flow path can be actuated by a control signal from a controller 222. The control signal may be in response to a measurement sensed within the duct assembly 1, for example, due to a change in temperature within the duct assembly 1. The control signal may also be in response to a predetermined period of time, for example, 5 minutes, 10 minutes, 15 minutes, 30 minutes, etc., which may be provided by a user.

In exemplary embodiments, the pressure sensor 34 is part of a control assembly 6 that controls the opening and closing of a damper 50. In one exemplary embodiment of a control assembly 6, specifically depicted in FIG. 3, a housing 100 is mounted to or otherwise associated with the air duct. A sensor 34, processor 102, actuator 104, power supply 106, controller 222, and pressure redirection device 204 may be disposed within the housing 100. A damper 50 is in operational communication with the actuator 104.

Figure 7:
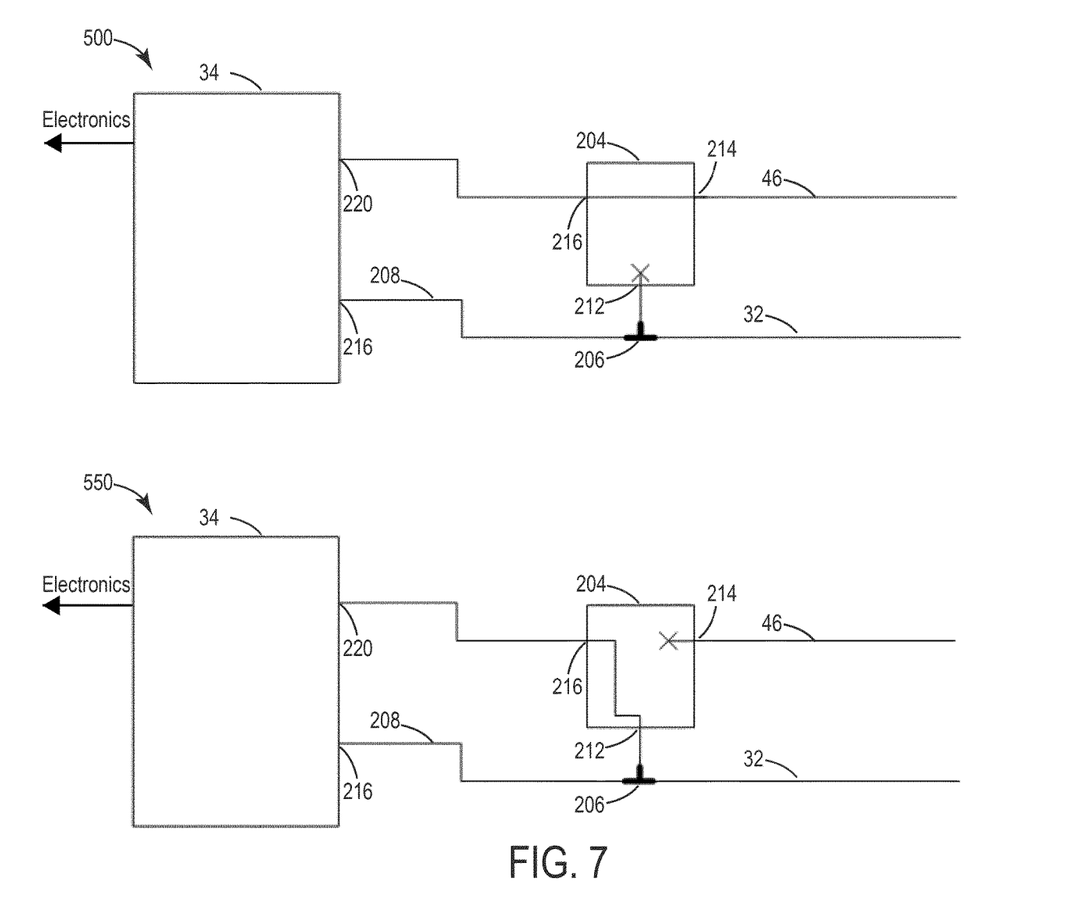
FIG. 7 is an illustration of an operating and calibrating state of a sensor, according to some embodiments.

In an operational mode 500 (e.g., operational state, etc.), shown in greater detail in FIG. 7, air flowing through the duct 1 in the direction of arrow A first encounters the high pressure detection apertures 40. A pressure is imported into the apertures 40 and into the chamber 43. The pressure then moves into the tube 46 via the nipple 44, and then into the high inlet 214 of the pressure redirection device 204. The common outlet 216 is fluidly coupled to the high inlet 214. The pressure moves from the high inlet 214 to the common outlet 216 and into the second inlet 220 of the pressure sensor 34. The pressure detected is the "high" pressure in the duct 1 (high pressure airflow), i.e., the pressure upstream from the airflow restrictor which is the channel 20.

Air flowing through the duct 1 next flows over the channel 20 and another pressure is imported into the apertures 22 and travels through the nipple 28, the tube 32, the T 206, and the tube 208, and into first inlet 209 of the pressure sensor 34. The low inlet 212 of the pressure redirection device 204 may be blocked in an operational mode 500, therefore airflow through tube 210 is limited. The pressure detected is the "low" pressure in the duct (e.g., low pressure airflow), i.e., the pressure at the point where airflow is restricted by the channel 20. The differential between the high pressure measurement and the low pressure measurement is an indication of the air velocity through the duct, specifically a scaled square root of the measured pressure (i.e., an application of Bernoulli's principle). The sensor 34 can send a signal to the control assembly 6 that in turn can cause the damper 50 to rotate so as to open or close the air duct 1.

In a calibration mode 550 (e.g., calibration state, etc.), air flowing through the duct 1 in the direction of arrow A first encounters the high pressure detection apertures 40. The high inlet 214 may be blocked in the calibration mode, therefore pressure imported into detection apertures 40 may be limited.

Air flowing through the duct 1 next flows over the channel 20 and pressure is imported by the apertures 22 and travels through the nipple 28, the tube 32, the T 206, and the tube 208, and into first inlet 209 of the pressure sensor 34. The pressure detected is the "low" pressure in the duct, i.e., the pressure at the point where airflow is restricted by the channel 20. The pressure also travels through the tube 210, and into the low inlet 212 of the pressure redirection device 204. The common outlet 216 is fluidly coupled to the low inlet 212. The pressure moves from the low inlet 212 to the common outlet 216 and into the second inlet 220 of the pressure sensor 34. The pressure detected is the "low" pressure in the duct, i.e., the pressure at the point where airflow is restricted by the channel 20 thus causing no differential pressure across the sensor 34 (e.g., shorting the sensor 34, etc.). Therefore the sensor 34 may read no value, however if the sensor reads a value, the value is an indication of an offset (e.g., calibration, error, etc.) of the sensor 34. The measurement the sensor 34 may be stored within a memory. The memory may be located within the controller 222, a processor 102, or may be within an external component (e.g., a mobile device, an offsite computer, etc.). The offset measurement can be used to transform measurements from the sensor 34 while in the operational mode 500 into accurate readings. The differential between measurements in the operational mode 500 and the offset measurement from the calibration mode indicate the actual measurements of air velocity through the duct.

In some examples, a first duct assembly 1 may be positioned within a room and a second duct assembly 1 may be positioned opposite the first duct assembly 1 within the room. Both the first duct assembly 1 and the second duct assembly 1 may enter the calibration mode and the operational mode independent of each other to measure offset measurements for each duct assembly 1. The first duct assembly 1 and the second duct assembly 1 may enter the calibration mode in unison. A static pressure within the room and across both the first duct assembly 1 and the second duct assembly 1 may be measured while both duct assemblies 1 are in the calibration mode. The measurement of static pressure may facilitate optimization of a fan speed or air flow within the room.

A duct assembly 1, specifically the pressure redirection device 204, may alternate between the calibration mode and the operational mode in response to a signal from the controller 222. The signal may be in response to a change in temperature, an expiration of a period of time, and/or a change in air pressure or velocity. The duct assembly 1 may also enter the calibration mode immediately once powering on and may alternate to the operational mode once an offset measurement is recorded. By way of example, the duct assembly 1 may be in the calibration mode for 0.25-2.5 seconds, more specifically 1.4 seconds before returning to the operational mode.

In exemplary embodiments, the pressure sensor 34 is a "dead-end" pressure sensor (versus a flow-through sensor); i.e., after the initial pressure is established no further airflow goes through the sensor. This can reduce the chance of the apertures 22 and 40 becoming clogged.

Figure 5:
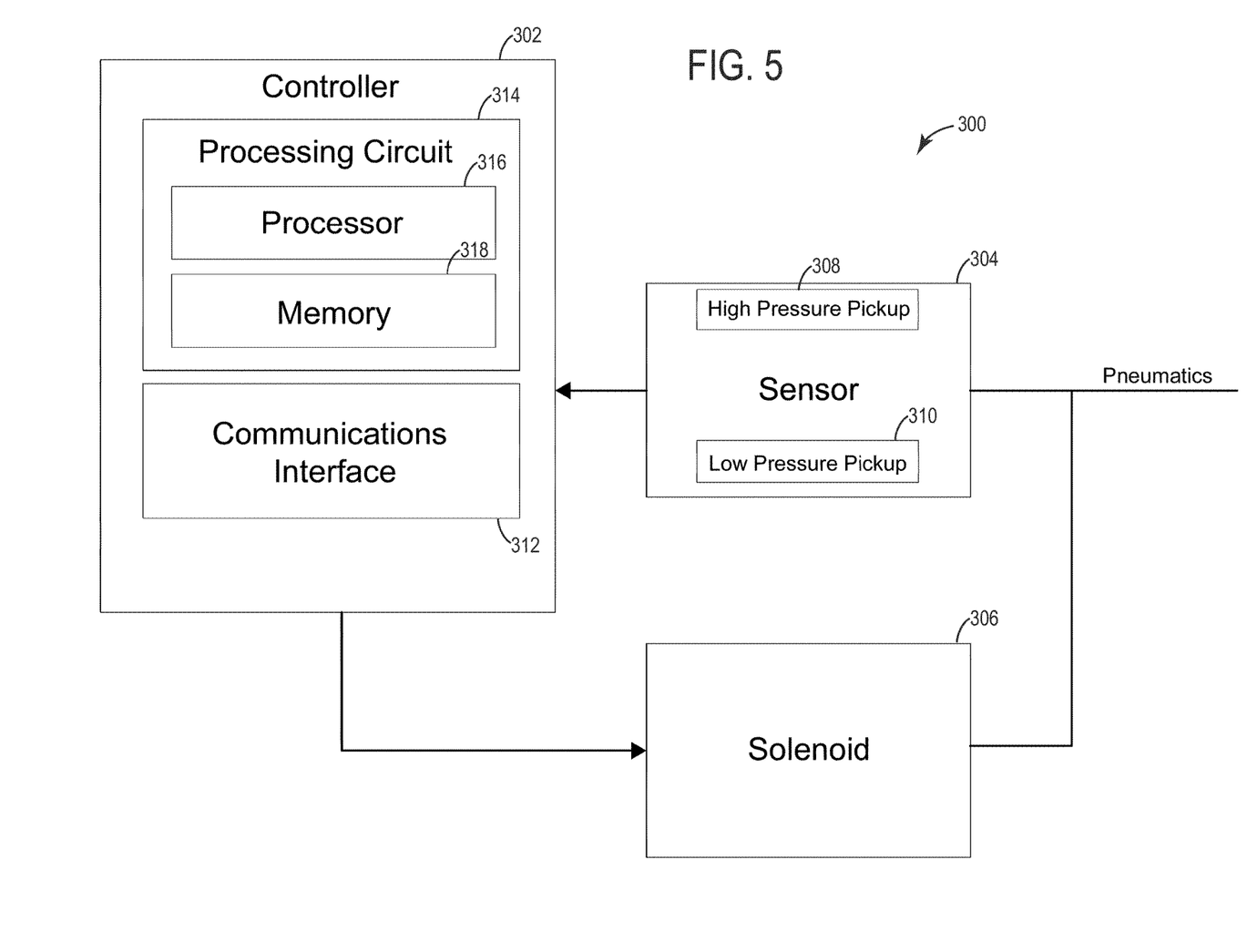
FIG. 5 is a block diagram of a sensor calibration assembly, according to some embodiments.

Referring now to FIG. 5, a block diagram of a calibration system 300 is shown. The calibration system 300 may be implemented in the air duct assembly 1 to automatically calibrate the sensor 34. The calibration system 300 is shown to include a controller 302, a sensor 304, and a solenoid 306. The sensor 304 includes a high pressure pickup 308 and a low pressure pickup 310. The controller 302 may be located remote of the other components. The controller 302 may include distributed processing, a server, etc. The calibration system 300 is not limited to the components, structure, or other details described above.

The controller 302 is shown to include a communications interface 312. The interface 312 may facilitate communications between the controller 302 and external applications (e.g., monitoring and reporting applications, enterprise control applications, remote systems and applications, applications residing on client devices, etc.) for allowing user control, monitoring, and adjustment to the controller 302. The interface 312 may also facilitate communications between the controller 302 and the client devices.

The interface 312 may be or include wired or wireless communications interfaces (e.g., jacks, antennas, transmitters, receivers, transceivers, wire terminals, etc.) for conducting data communications with building subsystems or other external systems or devices. In various embodiments, communications via the interface 312 may be direct (e.g., local wired or wireless communications) or via a communications network (e.g., a WAN, the Internet, a cellular network, etc.). For example, the interface 312 may include an Ethernet card and port for sending and receiving data via an Ethernet-based communications link or network. In another example, the interface 312 may include a Wi-Fi transceiver for communicating via a wireless communications network. In another example, the interface 312 may include cellular or mobile phone communications transceivers.

The controller 302 is shown to include a processing circuit 314 including a processor 316 and a memory 318. Processing circuit 314 may be communicably connected to interface 312 such that processing circuit 314 and the various components thereof may send and receive data via the interface 312. The processor 316 may be implemented as a general purpose processor, an application specific integrated circuit (ASIC), one or more field programmable gate arrays (FPGAs), a group of processing components, or other suitable electronic processing components.

The memory 318 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 318 may be or include volatile memory or non-volatile memory. The memory 318 may include database components, object code components, script components, or any other type of information structure for supporting the various activities and information structures described in the present application. According to an exemplary embodiment, the memory 318 is communicably connected to the processor 316 and includes computer code for executing (e.g., by the processing circuit 314 and/or the processor 316) one or more processes described herein.

The high pressure pickup 308 and low pressure pickup 310 are each configured to sense a pressure condition. The high pressure pickup 308 and the low pressure pickup 310 communicate the sensed pressure condition to the controller 302. The sensed pressure conditions may be stored within the memory 318. The sensor 304 sends signals to the controller 302 and the solenoid 306 may receive signals from the controller 302 to perform various functions as described herein. The sensor 304 and the solenoid 306 further may send and receive signals from pneumatics.

A controller (e.g., controller 222, controller 302, etc.) is configured to send and receive signals from a sensor (e.g., pressure sensor 34, sensor 304, etc.) and/or a secondary device (e.g., pressure redirection device 204, solenoid 306, etc.). For example, the controller can send signals to the secondary device to alter the flow path between an outlet and a high inlet or a low inlet. The signals may be sent in response to an expiration of a predetermined period of time, a change in temperature, or other factors. The controller may be located within an air duct assembly (e.g., air duct assembly 1, etc.) or may be located remote of the air duct assembly. Specifically, the controller may be located within the control assembly 6. The controller can calculate an actual pressure value, as described below in reference to FIG. 6. The controller can receive pressure values from the sensor, the values are related to inputs received at the first input and the second input.

Figure 6:
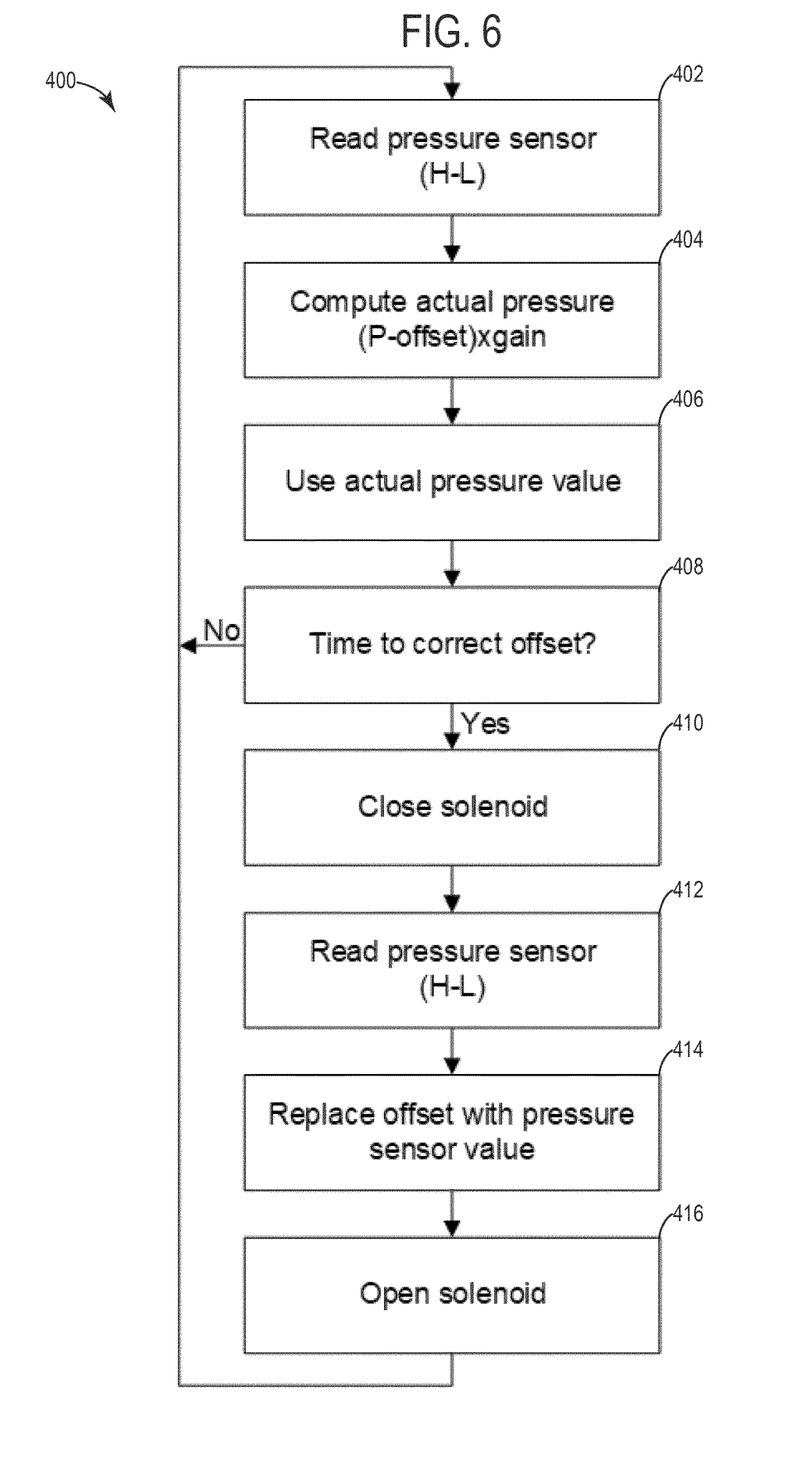
FIG. 6 is flow chart depicting a method of sensor calibration, according to some embodiments.

Referring now to FIG. 6, a method 400 of calibrating a sensor is shown, according to an exemplary embodiment. In various embodiments, control assembly 6 performs method 400. Control assembly 6 may perform method 400 in response to receiving a signal from a controller (e.g., controller 222, controller 302, etc.). At step 402 a pressure sensor reads a pressure (P) from a high pressure and a low pressure input. At step 404, an actual pressure is computed.

An offset value is subtracted from the pressure (P) and the adjusted pressure is multiplied by a gain. The gain may be a predetermined gain based off the sensor or on other parameters. At step 406, the actual pressure is used. The actual pressure may be communicated to a controller or to a user device. At 408, a controller determines if the offset needs to be corrected. The controller may be correcting the offset in response to an expiration of a predetermined period of time. If the controller determines the offset doesn't need to be corrected, the method 400 returns to step 402. If the controller determines the offset needs to be corrected, the method 400 proceeds to step 410. At step 410, the controller sends a signal to a solenoid to close. At step 412, the pressure sensor reads a pressure. At step 414, the offset value is replaced with the read pressure value. At step 416, the controller sends a signal to the solenoid to open and the method 400 returns to step 402.

As used in the specification and the appended claims, the singular forms "a," "an" and "the" include plural referents unless the context clearly dictates otherwise.

"Optional' or "optionally" means that the subsequently described event or circumstance may or may not occur, and that the description includes instances where said event or circumstance occurs and instances where it does not.

Throughout the description and claims of this specification, the word "comprise" and variations of the word, such as "comprising' and "comprises," means "including but not limited to," and is not intended to exclude, for example, other additives, components, integers or steps. "Exemplar" means "an example of" and is not intended to convey an indication of a preferred or ideal embodiment. "Such as" is not used in a restrictive sense, bur for explanatory purposes.

Disclosed are components that can be used to perform the disclosed methods, equipment, and systems. These and other components are disclosed herein, and it is understood that when combinations, subsets, interactions, groups, etc., of these components are disclosed that while specific reference of each various individual and collective combination and permutation of these may not be explicitly disclosed, each is specifically contemplated and described herein, for all methods, equipment and systems. This applies to all aspects of this application including, but not limited to, steps in disclosed methods. Thus, if there ae a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. An airflow assembly for an air duct, the air duct having an interior wall and an exterior wall, the airflow assembly comprising:
    a first pickup device;
    a second pickup device;
    a redirection device configured to fluidly connect a first inlet of a sensor to a second inlet of the sensor in response to a control signal, the redirection device being configured to fluidly disconnect the first inlet from the second inlet of the sensor in response to the control signal; and
    a control circuit electrically coupled to the sensor and the redirection device, the control circuit configured to:
    determine a pressure value in response to a sense signal received from the sensor when the redirection device fluidly connects the first inlet of the sensor to the second inlet of the sensor and in response to the sense signal when the redirection device fluidly disconnects the first inlet from the second inlet of the sensor.

2. The airflow assembly of claim 1, further comprising a first tube fluidly coupled to the first pickup device and a second tube fluidly coupled to the second pickup device.

3. The airflow assembly of claim 2, further comprising a bracket fluidly coupled to the first tube, wherein the bracket is a T-shaped bracket.

4. The airflow assembly of claim 3, further comprising a third tube fluidly coupled to the bracket and the sensor, and a fourth tube fluidly coupled to the bracket and the first inlet of the redirection device.

5. The airflow assembly of claim 1, wherein the control circuit sends the control signal to periodically cause the redirection device to fluidly connect the first inlet of the sensor to the second inlet of the sensor.

6. The airflow assembly of claim 5, wherein the control signal is provided in response to a characteristic in the air duct.

7. The airflow assembly of claim 6, wherein the characteristic is a temperature change.

8. The airflow assembly of claim 6, wherein the control circuit sends a signal to the redirection device to enter an operational mode until a threshold temperature is reached within the airflow assembly, then the airflow assembly enters a configuration mode for a period of time.

9. The airflow assembly of claim 1, further comprising a controller attached to the redirection device.

10. The airflow assembly of claim 1, wherein the pressure value determined in response to the sense signal received when the redirection device fluidly connects the first inlet of the sensor to the second inlet of the sensor is used to determine an offset value.

11. A method of measuring pressure in an air duct, the method comprising:
    controlling a redirection device to fluidly connect a first inlet of a sensor to a second inlet of the sensor;
    measuring a first value using the sensor;
    controlling the redirection device to fluidly disconnect the first inlet from the second inlet of the sensor;
    measuring a second value using the sensor;
    using the first value and the second value to determine a measured pressure in the air duct.

12. The method of claim 11, further comprising:
    controlling the redirection device to fluidly connect the first inlet of the sensor to the second inlet of the sensor after a period of time;
    measuring a third value using the sensor;
    controlling the redirection device to fluidly disconnect the first inlet to the second inlet of the sensor;
    measuring a fourth value using the sensor;
    using the fourth value and the third value to determine the measured pressure in the air duct.

13. The method of claim 12, wherein alternating between a configuration mode and an operational mode is in response to a signal from a controller.

14. The method of claim 11 further comprising:
    measuring a third value using the sensor;
    using the second value and the third value to determine the measured pressure in the air duct.

15. The method of claim 11, further comprising:
    controlling the redirection device to fluidly connect the first inlet of the sensor to the second inlet of the sensor in response to a temperature change;
    measuring a third value using the sensor;

controlling the redirection device to fluidly disconnect the first inlet to the second inlet of the sensor;

measuring a fourth value using the sensor;

using the fourth value and the third value to determine the measured pressure in the air duct.

16. The method of claim 11, wherein the sensor is a dead end pressure sensor.

17. An airflow sensor assembly; comprising:

a redirection device configured to be fluidly coupled to a first pressure pickup and a second pressure pickup, the redirection device comprising a first device inlet fluidly coupled to the first pressure pickup, and a second device inlet fluidly coupled to the second pressure pickup;

a pressure sensor attached to the redirection device, the pressure sensor comprising a first sensor inlet fluidly coupled to the first pressure pickup and a second inlet fluidly coupled to an outlet of the redirection device; and a controller configured to control the redirection device to selectively fluidly couple the first sensor inlet to the outlet, the controller being configured to control the redirection device to selectively fluidly couple the second device inlet to the outlet.

18. The airflow sensor assembly of claim 17, wherein the redirection device comprises a solenoid.

* * * * *